United States Patent [19]
Kulig

[11] Patent Number: 4,776,448
[45] Date of Patent: Oct. 11, 1988

[54] GLASS CONTAINER TRANSFER MECHANISM

[75] Inventor: Constantine W. Kulig, Windsor, Conn.

[73] Assignee: Emhart Industries, Inc., Farmington, Conn.

[21] Appl. No.: 103,080

[22] Filed: Sep. 30, 1987

[51] Int. Cl.$^4$ .............................................. B65G 47/26
[52] U.S. Cl. ................................. 198/477.1; 198/425; 198/457; 198/474.1
[58] Field of Search ...................... 198/456, 457, 469.1, 198/473.1, 474.1, 475.1, 476.1, 477.1, 484.1, 425

[56] References Cited

U.S. PATENT DOCUMENTS

| | | | |
|---|---|---|---|
| 2,570,198 | 10/1951 | Brager | 198/476.1 X |
| 2,912,093 | 11/1959 | Lauck | |
| 3,701,407 | 10/1972 | Kulig | |
| 3,845,852 | 11/1974 | Langen et al. | 198/425 |
| 4,354,590 | 10/1982 | Langen | 198/425 |
| 4,411,353 | 10/1983 | McDole | 198/425 |

FOREIGN PATENT DOCUMENTS

| | | | |
|---|---|---|---|
| 0050036 | 3/1984 | Japan | 198/469.1 |
| 1449904 | 9/1976 | United Kingdom | 198/469.1 |

*Primary Examiner*—Robert J. Spar
*Assistant Examiner*—Lyle Kimms
*Attorney, Agent, or Firm*—Spencer T. Smith

[57] ABSTRACT

Glass containers are pushed from an infeed conveyor through an arcuate path to a cross conveyor by pushers which have L-shaped fingers which are advanced to an advanced position to engage the containers and which can automatically reorient to maintain the container perfectly centered within the fingers until the container is displaced to a deposit location. The fingers are then pivotally displaced away from the container and subsequently repositioned at the advanced position.

4 Claims, 3 Drawing Sheets

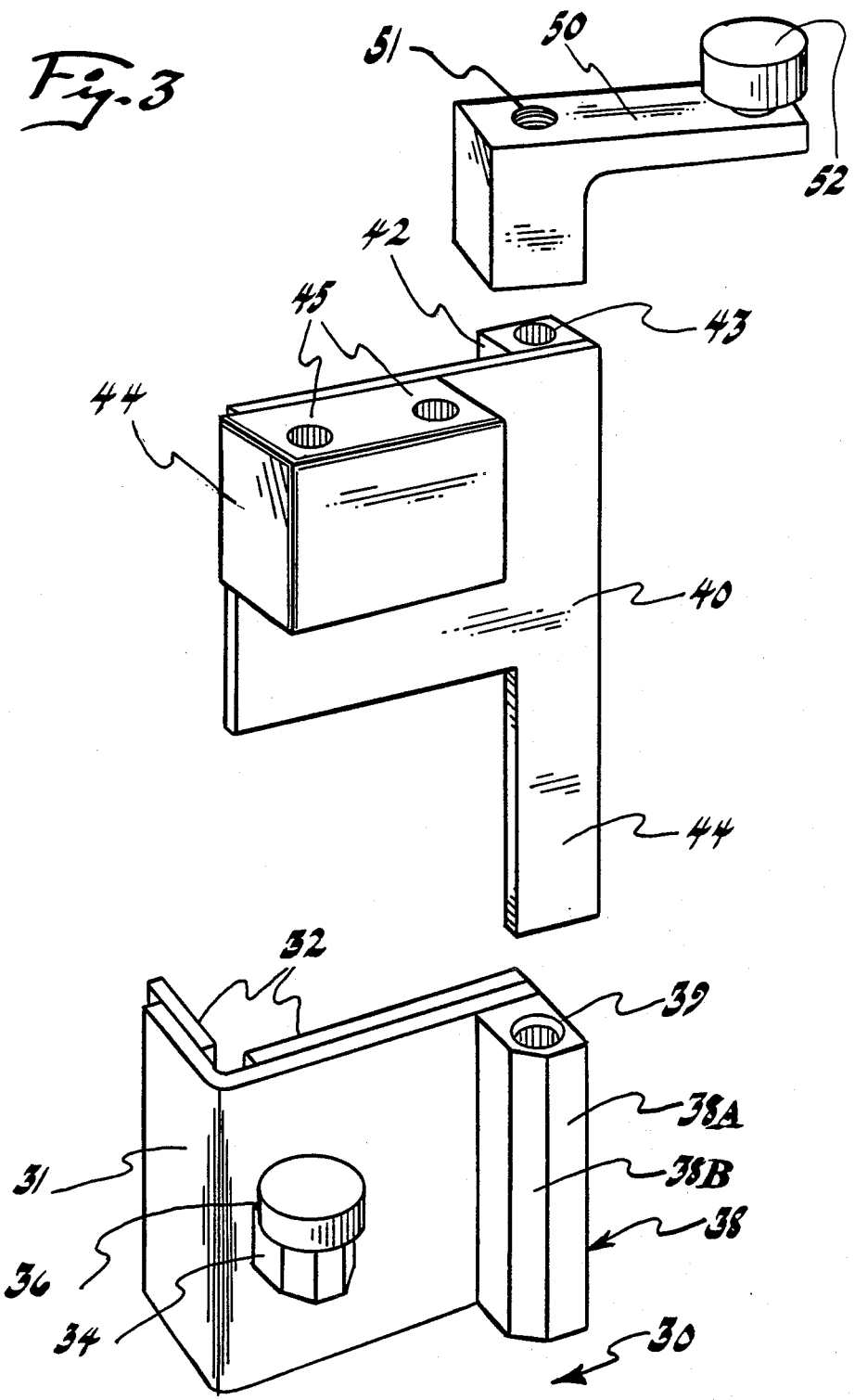

GLASS CONTAINER TRANSFER MECHANISM

The present invention relates to transfer mechanisms for transferring newly formed hot glass containers from an infeed conveyor to a cross conveyor.

The glassware transfer mechanism disclosed in U.S. Pat. No. 3,701,407 is accepted as the worldwide standard for glass container plants.

It is an object of the present invention to improve this transfer mechanism so that the operating rate can be substantially increased.

Another object is to handle containers widely positioned on the infeed conveyor and to transfer them to a cross-conveyor in a very closely spaced pattern, which results in a high speed infeed conveyor to a low speed secondary conveyor. This results in transfer of glass articles in a stable manner, equal spaced and without loss of glass articles, heretofore, not achieved with present day equipment.

Yet another object is to accommodate transfer of glass articles to a secondary conveyor that are angularly positioned from perpendicular to primary conveyor within 15° both acute and obtuse angles.

Other objects and advantages of the present invention will become apparent from the following portion of this specification and from the accompanying drawings which illustrate in accordance with the mandate of the patent statutes, a presently preferred embodiment incorporating the principles of the invention.

Referring to the drawings:

FIG. 3 is an oblique, exploded view of three elements of the pusher assembly.

Figure 1:
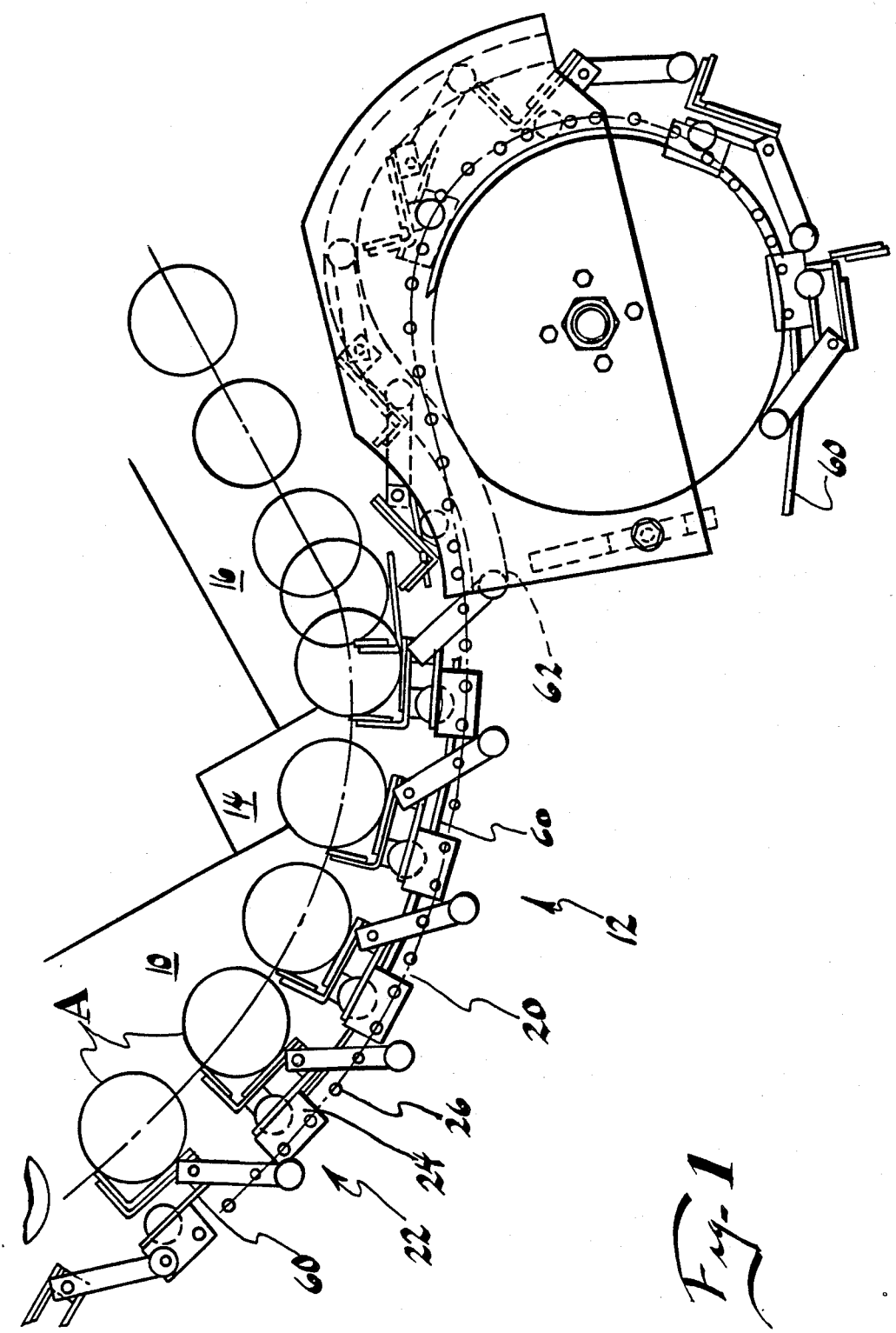
FIG. 1 is a top view of a portion of a glassware transfer mechanism made in accordance with the teachings of the present invention, showing glassware articles being transferred from an infeed conveyor to a cross conveyor.

An infeed conveyor 10 delivers glassware containers A in single file to a transfer mechanism 12 which transfers the containers across a dead plate 14 to a cross conveyor 16 which extends generally perpendicularly (±15°) to the infeed conveyor. The carrier chain 20 of the transfer mechanism 12 carries equally spaced pushers 22 which include a support bracket assembly 24 secured to the conveyor pins 26.

Figure 2:
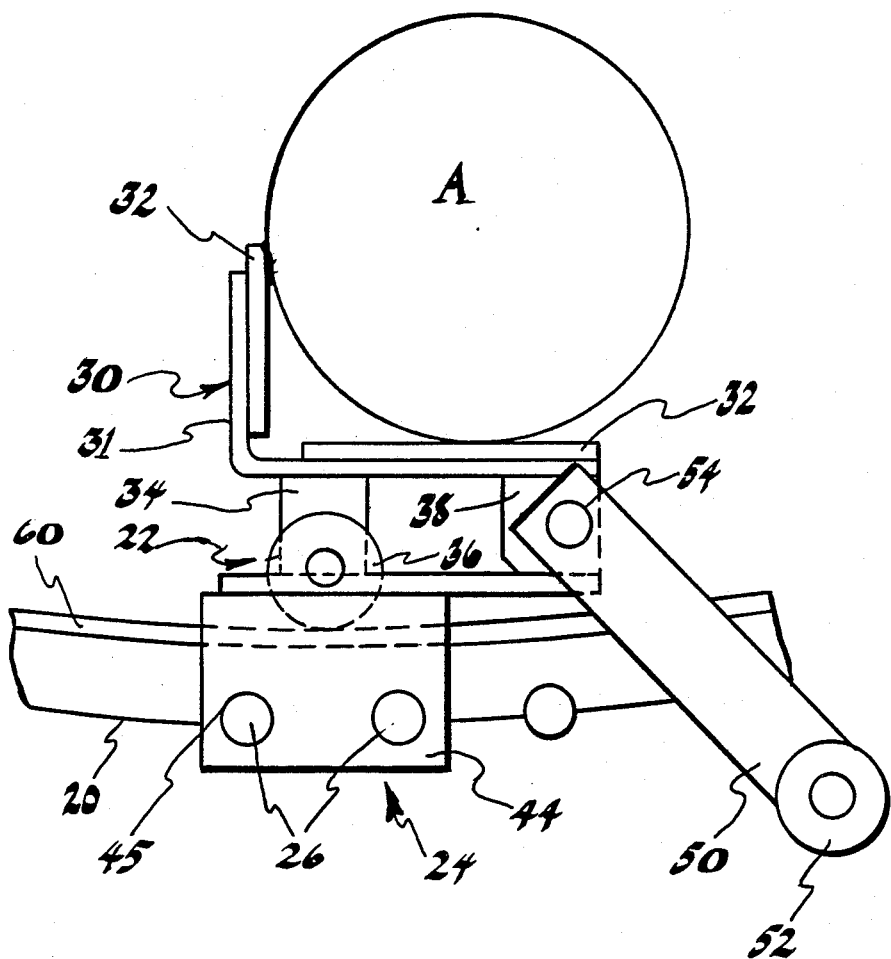
FIG. 2 is an enlarged top view of a pusher assembly of the transfer mechanism shown in FIG. 1.

As can be seen from FIGS. 2 and 3, the pusher 22 also includes a finger assembly 30 which has an L-shaped finger bracket 31 to which are releasably secured pads 32 for engaging a container, a roller bracket 34 which is secured to the finger bracket 31 and which supports a first or inner roller 36, and a bearing sleeve member 38 having a thru bore 39 extending vertically therethrough. The support bracket assembly 24 includes a mounting plate 40 which has a depending portion 41 adjacent to the outer planar surface 38A of the bearing sleeve member 38, a bearing sleeve member 42 having a vertical thru bore 43 and a block member 44 having a pair of carrier pin receiving bores 45. The pusher 22 is completed by a lever member 50 having a vertical thru bore 51 at one end and a second roller 52 at the other, and a roller bearing shaft 54 (FIG. 2) which extends through the pusher bores 39, 43, 51 and is fastened to the finger assembly 30 and to the lever member 50.

The inner roller 36 rides on the outer surface of a guide rail 60 (see FIGS. 1 and 2) which extends almost entirely around the conveyor 20 (FIG. 3). As a pusher 22 approaches the infeed conveyor 10, the inner roller 36 rides on the guide rail 60 and the finger assembly 30 is at the fully advanced position (FIG. 2). The pads 32 engage a bottle and automatically centrally locate the container between the pads of the L-shaped bracket 31. The conveyor 20, during the transfer operation, follows a concave path to change the direction of the container by about 90° between the pads 32. The guide rail 60 ends as the container approaches the cross conveyor, and the finger element 30 is then free to rotate about shaft 54 (the corner 38B of the sleeve 38 is suitably beveled.). The outer roller 52 then enters into a cam groove 62. This groove 62 is defined so that when the finger assembly 30 has located the container in alignment with the other containers on the cross conveyor 16, the lever arm 50 will be rapidly pivoted in the counterclockwise direction to pivot the finger assembly 30 to the fully retracted position and will maintain the finger element away from the containers on the cross conveyor as the pusher is displaced along the conveyor.

Once clear of the bottles on the cross conveyor, the guide cam 62 pivots the finger assembly toward the fully advanced position, and this pivotal displacement to the fully advanced position is completed by the guide track 60 which engages the inner roller 36 once the outer roller 52 has left the cam guide 62. The finger assembly is maintained at this fully advanced position from the time a container is picked up until the inner roller 36 leave the guide track. Pivoting the finger assembly beyond the fully advanced position is prevented by the depending portion 41 of the mounting plate 40 which engages the outer planar surface 38A of the sleeve member 38 when the finger assembly reaches the fully advanced position.

I claim:

1. A transfer mechanism for transferring containers from an infeed conveyor to a cross conveyor comprising
   a conveyor,
   a plurality of pushers secured to said conveyor for engaging glass containers at a pick-up location on the infeed conveyor and pushing the engaged containers onto the cross conveyor at a deposit location, each of said pushers including
   a finger assembly having L-shaped finger means for engaging a container and having first and second roller means,
   means for mounting said finger assembly for pivotal displacement between advanced and retracted positions,
   guide rail means extending in the direction of motion of said conveyor from a third location proximate said deposit location to a location proximate said pick-up location location for engaging said first roller means and positioning said pusher at said advanced position at said pick-up location, and
   cam groove means extending from a location proximate said deposit location to a location beyond said third location for engaging said second roller and displacing said finger assembly from said advanced position to said retracted position when the engaged container has been displaced to said deposit location.

2. A transfer mechanism according to claim 1, wherein said cam groove means further comprises means to displace said finger assembly back towards said advanced position following the displacement of said finger assembly by said cam groove means to said retracted position.

3. A transfer mechanism according to claim 2, wherein said cam groove means further comprises means for displacing said first roller into engagement with said guide rail means.

4. A transfer mechanism according to claim 3 further comprising means for preventing the advancement of said finger assembly beyond said advanced position.

* * * * *